(12) United States Patent
Alexander et al.

(10) Patent No.: US 10,456,008 B2
(45) Date of Patent: Oct. 29, 2019

(54) LEARNING DISPENSING SYSTEM FOR WATER INLET HOSE

(71) Applicant: WHIRLPOOL CORPORATION, Benton Harbor, MI (US)

(72) Inventors: Benjamin E. Alexander, Stevensville, MI (US); Joel M. Sells, Watervliet, MI (US); Eric J. Schuh, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 63 days.

(21) Appl. No.: 15/363,302

(22) Filed: Nov. 29, 2016

(65) Prior Publication Data

US 2018/0146835 A1    May 31, 2018

(51) Int. Cl.
*A47L 15/46*     (2006.01)
*A47L 15/00*     (2006.01)
(Continued)

(52) U.S. Cl.
CPC ............. *A47L 15/46* (2013.01); *A47L 15/006* (2013.01); *A47L 15/0021* (2013.01); *A47L 15/0047* (2013.01); *A47L 15/0049* (2013.01); *A47L 15/0055* (2013.01); *A47L 15/0063* (2013.01); *A47L 15/4217* (2013.01); *A47L 15/4223* (2013.01); *A47L 15/4293* (2013.01); *A47L 15/449* (2013.01); *D06F 35/005* (2013.01); *D06F 35/006* (2013.01); *D06F 39/02* (2013.01); *D06F 39/022* (2013.01); *D06F 39/08* (2013.01); *D06F 39/083* (2013.01); *G05B 15/02* (2013.01); *A47L 15/4214* (2013.01); *A47L 2401/023* (2013.01); *A47L 2401/03* (2013.01); *A47L 2401/14* (2013.01); *A47L 2401/34* (2013.01); *A47L 2501/01* (2013.01); *A47L 2501/02* (2013.01); *A47L 2501/07* (2013.01);
(Continued)

(58) Field of Classification Search
CPC .. D06F 2202/08; D06F 2204/08; D06F 33/02; D06F 35/00; D06F 35/005; D06F 35/006; D06F 39/00; D06F 39/02; D06F 39/08; D06F 39/083; D06F 39/003; D06F 2202/02; D06F 2204/084; D06F 2204/086; A47L 15/0047; A47L 2401/34; A47L 2501/01; A47L 2501/05; A47L 2501/07
See application file for complete search history.

(56) References Cited

U.S. PATENT DOCUMENTS 5,056,542 A    10/1991  Reinhard
5,556,478 A    9/1996   Brady et al.
(Continued)

FOREIGN PATENT DOCUMENTS

DE    19643270 A1    4/1998
EP    0517753 B1     1/1996
(Continued)

*Primary Examiner* — Crystal J Barnes-Bullock
(74) *Attorney, Agent, or Firm* — McGarry Bair PC

(57) ABSTRACT

A retrofit auxiliary device for distributing cleaning resources to a household cleaning appliance having a treating chamber is described wherein the device can connect to various household cleaning appliances of different makes and models and can learn the flow of water and detergent during various stages of operation and then perform the dispensing itself.

16 Claims, 3 Drawing Sheets

(51) Int. Cl.
   *D06F 35/00*       (2006.01)
   *D06F 39/08*       (2006.01)
   *A47L 15/42*       (2006.01)
   *A47L 15/44*       (2006.01)
   *D06F 39/02*       (2006.01)
   *G05B 15/02*       (2006.01)
   *D06F 39/00*       (2006.01)

(52) U.S. Cl.
   CPC .......... *A47L 2501/26* (2013.01); *D06F 39/005* (2013.01); *D06F 2202/02* (2013.01); *D06F 2202/08* (2013.01); *D06F 2204/084* (2013.01); *D06F 2204/086* (2013.01)

(56) References Cited

U.S. PATENT DOCUMENTS

| | | | |
|---|---|---|---|
| 5,883,802 A * | 3/1999 | Harris | A47L 15/0047 700/27 |
| 6,143,257 A | 11/2000 | Spriggs et al. | |
| 6,377,868 B1 | 4/2002 | Gardner, Jr. | |
| 7,292,914 B2 * | 11/2007 | Jungmann | B01F 13/1055 222/71 |
| 7,658,088 B2 | 2/2010 | Walker et al. | |
| 8,117,703 B2 | 2/2012 | Walker et al. | |
| 8,968,483 B2 * | 3/2015 | Slabbekoorn | A47L 15/0028 134/10 |
| 9,438,678 B2 * | 9/2016 | DeSalvo | H04L 67/12 |
| 9,624,617 B2 * | 4/2017 | Leonard | D06F 39/003 |
| 9,890,493 B2 * | 2/2018 | Hendrickson | D06F 39/003 |
| 10,004,380 B2 * | 6/2018 | Carlhoff | A47L 15/0055 |
| 10,094,060 B2 * | 10/2018 | Frucco | D06F 33/02 |
| 2002/0117187 A1 | 8/2002 | Helminger | |
| 2004/0015269 A1 * | 1/2004 | Jungmann | B01F 13/1055 700/283 |
| 2009/0276101 A1 | 11/2009 | Yankee et al. | |
| 2011/0031272 A1 | 2/2011 | Comiskey et al. | |
| 2011/0126861 A1 | 6/2011 | Dorigo et al. | |
| 2012/0193985 A1 | 8/2012 | Kim et al. | |
| 2013/0073690 A1 * | 3/2013 | DeSalvo | H04L 67/125 709/219 |
| 2014/0123403 A1 * | 5/2014 | Zattin | D06F 25/00 8/137 |
| 2015/0113739 A1 * | 4/2015 | Pollett | D06F 33/02 8/137 |
| 2016/0201242 A1 * | 7/2016 | Leonard | D06F 33/02 8/137 |
| 2017/0037558 A1 * | 2/2017 | Dunsbergen | D06F 39/022 |
| 2017/0037559 A1 * | 2/2017 | Gallagher | D06F 39/022 |
| 2017/0248925 A1 * | 8/2017 | Root | H04W 4/70 |
| 2018/0291911 A1 * | 10/2018 | Ward | F04B 17/03 |

FOREIGN PATENT DOCUMENTS

| | | |
|---|---|---|
| EP | 0787849 A1 | 8/1997 |
| EP | 2289385 A2 | 3/2011 |
| EP | 2653086 | 10/2013 |
| WO | 9847053 A2 | 10/1998 |
| WO | 2005048806 A1 | 6/2005 |

* cited by examiner

LEARNING DISPENSING SYSTEM FOR WATER INLET HOSE

BACKGROUND

Household cleaning appliances include various appliances such as dishwashers and washing machines. The household cleaning appliance may have a controller that implements a number of pre-programmed cycles of operation having one or more operating parameters. The controller may control a motor or rotate the drum according to one of the pre-programmed cycles of operation. The controller may control the motor or rotate the drum at the same speeds for a give pre-programmed cycle of operation regardless of the characteristics of the items loaded into the household cleaning appliance, or changes in the system. There are a great many different makes and models of household cleaning appliances currently in the marketplace. They each have different cycle times, inlet and outlet water flow rates, different methods and times of introducing treating chemistry, different amounts of wash and rinse phases, etc. It would be advantageous to be able to have a smart retrofittable device that could regulate these parameters externally and detect aberrations in the cycles of operation, if any.

BRIEF SUMMARY

In one aspect, a retrofit auxiliary device for distributing cleaning resources to a household cleaning appliance having a treating chamber comprises at least one water inlet configured to connect to a supply of water, at least one outlet configured to connect to the household cleaning appliance for distribution of water within the household cleaning appliance, a flow meter configured to monitor a flow of the water from the at least one water inlet and to transmit a signal containing water flow information, a memory having information that correlates the water flow information to a cycle of operation in the household cleaning appliance, a detergent dispenser configured to connect to the household cleaning appliance to dispense a treating chemistry to the household cleaning appliance in response to receiving dispense commands, and a controller operably coupled to the flow meter, the memory, and the detergent dispenser, wherein the controller is configured to determine a cycle of operation being executed by the household cleaning appliance based on the water flow information, and send dispense commands to the dispenser in accordance with the determined cycle of operation.

DETAILED DESCRIPTION

Figure 1:
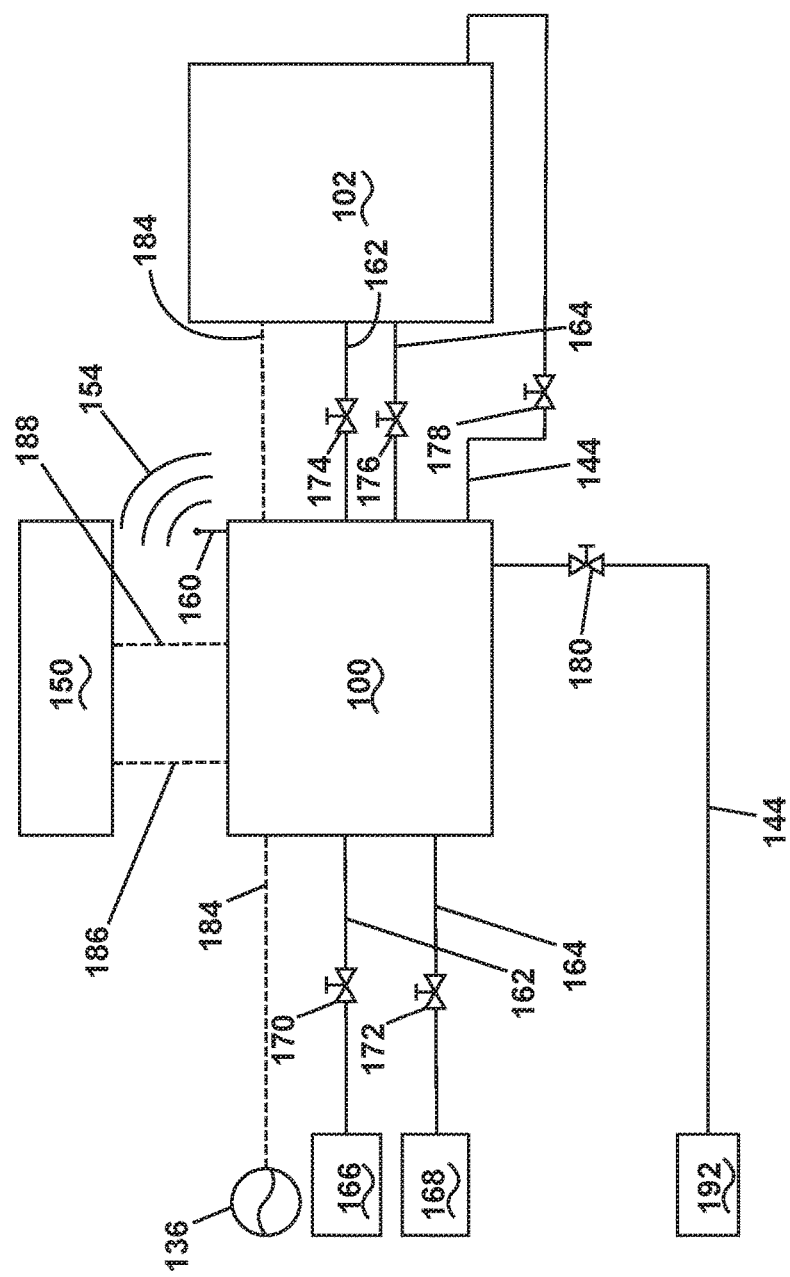
FIG. 1 is a schematic diagram of an embodiment of a retrofit auxiliary device according to the invention coupled to a household appliance.

FIG. 1 schematically illustrates a retrofit auxiliary device 100 for distributing cleaning resources to a household cleaning appliance 102. This device may be designed to be compatible with a range of makes and models of various household appliances, including but not limited to, a dishwasher or a washing machine. For example, the device 100 may be capable of connecting and providing hot water, cold water, detergent, power or any combination thereof, to a variety of makes of household cleaning appliances offered by a variety of manufacturers. The retrofit auxiliary device 100 may accomplish this by connecting to inlets that are available on a variety of household cleaning appliances (e.g., pre-existing hot water inlets, cold water inlets, or power inlets). The retrofit auxiliary device 100 is capable of distributing appropriate quantities of hot water, cold water, detergent and/or power to any of a variety of household cleaning appliances, even though various household cleaning appliances may implement different types of cycles that have different respective requirements. In exemplary implementations, the retrofit auxiliary device 100 monitors at least one of hot water, cold water, detergent, power and/or drain activity of household cleaning appliances in order to make appropriate determinations of what type of cycle that household cleaning appliance is executing. In response, the retrofit auxiliary device 100 distributes at least one of hot water, cold water, detergent, power, or combinations thereof as appropriate for a particular cycle.

The retrofit auxiliary device 100 comprises at least one hot water inlet 106 and at least one cold water inlet 108. The hot water inlet 106 and the cold water inlet 108 are connected to a hot water line 162 and a cold water line 164 respectively. The hot water line 162 and the cold water line 164 are, in turn, coupled to the hot water inlet 106 and the cold water inlet 108 via a hot water inlet connection 110 and a cold water inlet connection 112. The hot water line 162 and the cold water line 164 will typically draw from a hot water mains 166 and a cold water mains 168, respectively. The hot water line 162 and the cold water line 164 may in turn pass through a hot water inlet valve 170 and a cold water inlet valve 172 respectively, on their way from the hot water mains 166 or the cold water mains 168 to the hot water inlet connection 110 or the cold water inlet connection 112 respectively. The hot water inlet valve 170 and the cold water inlet valve 172 are typically manually operated valves.

The retrofit auxiliary device receives electric power from a source of power 136 via a power line 184. The power thus received is also used to power a user interface 150 and the household cleaning appliance 102. The user interface is supplied power from the retrofit auxiliary device via a user interface power line 186. The user interface power line 186 may also be used to send various communication signals to the user interface 150. The user interface 150 uses a user interface input line 188 to communicate various user inputs to the retrofit auxiliary device 100. The household cleaning appliance 102 receives electric power from the retrofit auxiliary device 100 via a household appliance power line 184. The household appliance power line 184 may also be used to send various communication signals to the household cleaning appliance 102. Communication between the household cleaning appliance 102 and the retrofit auxiliary device 100 may also occur through other means such as various types of networks, including but not limited to a wireless network such as a local Wi-Fi network, a cellular network, Bluetooth, NFC, or RF communications.

The retrofit auxiliary device 100 also comprises an antenna 160 that enables the device to connect to a network 154. The network 154 can be a wireless network including but not limited to a local Wi-Fi network. The antenna 160 may be used to transmit various data to the user's home devices, including but not limited to a cellular phone and a printer. This network 154 may be used to transmit various data, including but not limited to appliance performance, appliance energy consumption, treating chemistry levels, and water softener levels. In addition, it may also be used to transmit various signals to the household cleaning appliance to regulate its operation, in a wireless manner.

While the user interface has been shown here to be physically distinct from the retrofit auxiliary device, it should be noted that it may also be an integral part of the device. If the user interface is to be physically distinct, it may also send and receive data wirelessly via the antenna 160 over the network 154.

The retrofit auxiliary device 100 also comprises at least one hot water outlet 114 and at least one cold water outlet 116. The hot water outlet 114 and the cold water outlet 116 are connected to the hot water line 162 and a cold water line 164 respectively as shown in FIG. 1, such that the hot water line 162 and the cold water line 164 feed the household cleaning appliance 102. The hot water line 162 and the cold water line 164 are in turn coupled to the hot water outlet 114 and the cold water outlet 116 via a hot water outlet connection 118 and a cold water outlet connection 120. The hot water line 162 and the cold water line 164 may in turn pass through a hot water outlet valve 174 and a cold water outlet valve 176 respectively, on their way from the hot water outlet connection 118 or the cold water outlet connection 120 to the household cleaning appliance 102. The hot water outlet valve 174 and the cold water outlet valve 176 may be manually operated valves.

The retrofit auxiliary appliance also comprises a drain connection 142 that couples a drain outlet 192 to a drain line 144. The drain line 144 is also coupled to the household cleaning appliance via a drain inlet connection 194 which in turn feeds a drain inlet 196. A drain inlet valve 178 and a drain outlet valve 180 may be placed along drain line 144 as shown in FIG. 1 and are manually operated valves.

Figure 2:
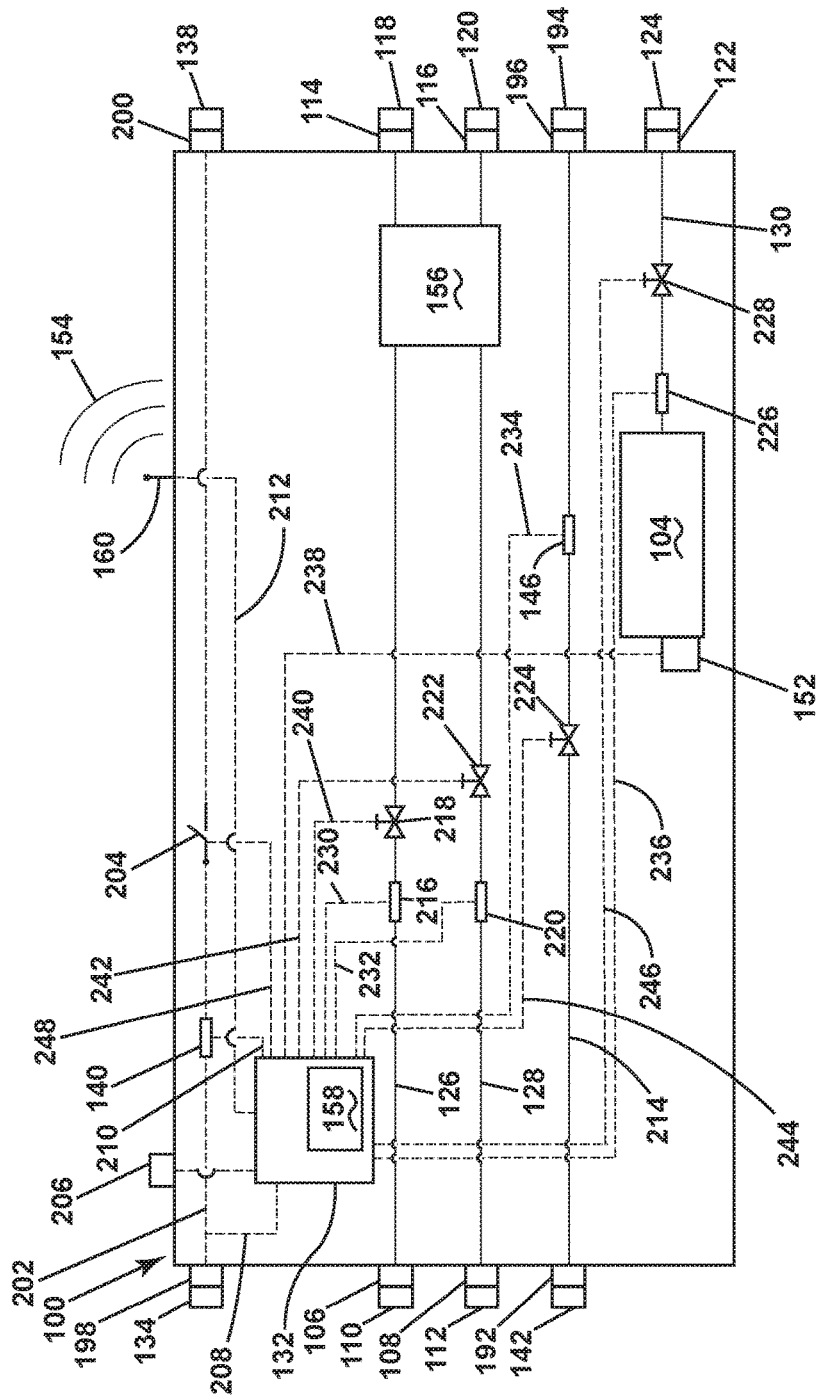
FIG. 2 is a schematic diagram of an embodiment of a retrofit auxiliary appliance according to the invention.

FIG. 2 schematically illustrates the retrofit auxiliary device 100. The power line 184 is coupled to the retrofit auxiliary device 100 via a power inlet connection 134 and a power inlet 198 and feeds power to the household cleaning appliance 102 through a power outlet 200 and a power outlet connection 138. The power inlet 198 is electrically connected to the power outlet 200 via a power pass through channel 202, a power consumption monitor 140 and a switch 204.

The user interface power line 186 is coupled to a user interface connection 206. A controller 132 may control the functioning of the retrofit auxiliary device 100. The controller 132 has a memory 158. The controller 132 may be coupled to the power inlet 198 via a controller power line 208. The power consumption monitor 140 is coupled to the controller 132 via a power consumption monitoring line 210. Antenna 160 is coupled to controller 132 via an antenna signal line 212.

The hot water inlet 106, the cold water inlet 108 and the drain inlet 196 are fluidly coupled to the hot water outlet 114, the cold water outlet 116 and the drain outlet 192 respectively, via a hot water pass through channel 126, a cold water pass through channel 128 and a drain pass through channel 214 respectively. The hot water pass through channel has a hot water flow meter 216 and a hot water control valve 218. The cold water pass through channel has a cold water flow meter 220 and a cold water control valve 222. The drain pass through channel has a drain flow meter 146 and a drain control valve 224. It is within the scope of the disclosure to have a single pass through channel with multiple inlets and outlets and controlling valves. The flow meters 216, 220 and 146 could have designs, including but not limited to, an impeller, a turbine, an ultrasonic sensor, an electromagnetic sensor or a capacitive sensor.

The data collected from the hot and cold water flow meters 216 and 220 respectively, could be subsequently used by the device to assess an appropriate time to add treating chemistry to the household cleaning appliance 102, determine what stage the household cleaning appliance 102 is during its cycle of operation, or to measure how much water or treating chemistry has been used by the machine.

The data collected from the drain flow meter 146 could pertain to when treating chemistries have been removed from the household cleaning appliance 102, determine what stage the household cleaning appliance 102 is during its cycle of operation, or to measure how much water or treating chemistry has been evacuated by the machine.

The retrofit auxiliary device 100 also comprises a treating chemistry reservoir 104, to which is attached a sensor 152 which senses the level of remaining treating chemistry in the treating chemistry reservoir 104. The treating chemistry reservoir 104 includes, but is not limited to a laundry chemistry reservoir or a detergent reservoir for a dishwasher. The treating chemistry reservoir 104 could exist in various configurations with respect to the retrofit auxiliary device, and in various forms, including but not limited to, internal to the retrofit auxiliary laundry device, external to the retrofit auxiliary laundry device, disposable, or multipod. The treating chemistry reservoir 104 is fluidly coupled with a treating chemistry outlet 122 via a treating chemistry pass through channel 130, which in turn supplies treating chemistry to the household cleaning appliance 102 via a treating chemistry outlet connection 124. The treating chemistry pass through channel 130 has a treating chemistry flow meter 226 and a treating chemistry control valve 228. The treating chemistry reservoir 104 contains a treating chemistry, including but not limited to a liquid detergent, a powder detergent, water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

Monitoring lines 230, 232, 234, 236, and 238 monitor flow meters 216, 220, 146, 226, and sensor 152 respectively via the controller 132. Control lines 240, 242, 244, 246, and 248 control the valves 218, 222, 224, 228 and switch 204 respectively.

In addition, the hot water pass through channel 126 and the cold water pass through channel 128 may pass through an interface 156 that provides water pre-treatment utility, such as a water softening.

Since the various inlet and outlet connections on the retrofit auxiliary device are configured to adapt to various makes and models of household cleaning appliances, they can be attached to the household cleaning appliance in virtually any household where better appliance performance and better appliance monitoring are desired.

The retrofit auxiliary device 100 can have a variety of different cycles of operation stored as data in the memory 158. If the household cleaning appliance 102 is to be operated using a cycle in the memory 158, then the household cleaning appliance 102 will be regulated and controlled via the power line 184, which can also be used to supply various signals to the household cleaning appliance 102. The flow of various lines can be monitored via the various flow meters and the power consumption monitor, and the data thus gathered can be used by the controller 132 to monitor the overall health of the household cleaning appliance 102. This data can be displayed on a selective or a detailed level on the user interface 150.

The household cleaning appliance 102 can have a factory default cycle of operation that is not stored in the memory 158 of the controller 132. The factory default cycle of operation is the cycle of operation that would be used by the appliance in the absence of the retrofit auxiliary device 100. In this case, the retrofit auxiliary device 100 can be run first through a learning cycle, where the retrofit auxiliary device 100 does not control the functioning of the household cleaning appliance 102, but instead simply monitors the flow through the various flow meters via the various monitoring lines, and stores the rates and duration for which those rates are maintains and effectively learns the cycle of operation of the particular household cleaning appliance. This data is then stored in the memory 158 of the controller 132, and can be subsequently used to run the cycle of operation of the particular household cleaning appliance via the retrofit auxiliary device 100.

The newly learned cycle of operation may then be uploaded via the network 154 to an online database from where it could be available for download to other users of the retrofit auxiliary device. The memory 158 in turn could also receive periodic firmware updates from the manufacturer regarding various newly known cycles of operation.

The retrofit auxiliary device may be connected to one or even more than one household cleaning appliance, thereby enabling it to monitor the energy, water and treating chemistry usage of multiple household cleaning appliances. This data could be used to provide real time feedback to the user regarding non-limiting examples including appliance resource usage, appliance cycle times, appliance cycle efficiency, an adverse event occurrence in the appliance, status of the currently ongoing cycle of operation. The data accrued could also be used to alert the user to actions that need user input or user action, including but not limited to re-ordering treating chemistry, or starting an appliance cycle at a predetermined time.

The controller 132 can also have a clock to record time and day when certain cleaning cycles are usually performed and then alert the user of the household cleaning appliance 102 via the antenna 160 over the network 154 to send the user a message including but not limited to a text message alert, reminding the user to run the cleaning cycle.

If the parameters such as flow of power and fluids during a cycle of operation are known or learnt by the controller 132, then a marked deviation from these parameters can be detected by the various monitoring lines, and this data can be used by the controller 132 to detect flaws, malfunctions and adverse events such as water leaks, to take appropriate corrective or safety action. A non-limiting example of this would be that if the controller 132 detects a leak, it would turn off switch 204 via control line 248 to prevent the danger of electric shock to the user.

The monitoring capabilities of the power consumption monitor 140 can be used to send the monthly or per cycle power consumption data to the user by sending the user a message that includes, but is not limited to a text message alert. This can be accomplished by the controller 132 via the antenna signal line 212 and the antenna 160 over the network 154. The user can be similarly alerted when the sensor 152 detects that the level of treating chemistry in the treating chemistry reservoir 104 is below a predetermined threshold, and thus the user knows to order an additional quantity of treating chemistry.

The retrofit auxiliary device 100 could be designed to dispense different levels of treating chemistry corresponding to the amounts of such treating chemistries dispensed manually by the user. These custom levels of dispensed treating chemistries would have to be actuated by settings adjusted on the device via the user interface 150 prior to the cycle of operation in order for the treating chemistry to be dispensed. A feature could be provided to allow the user to fluidly couple the treating chemistry reservoir 104 to the retrofit auxiliary device 100 and secure it in that position. Algorithms could be used to determine the start of a new cycle of operation based on the various being monitored, and the treating chemistry could be dispensed automatically without requiring the user to reload the system with treating chemistry. This could be done by a dispensing command sent from controller 132 by using the control line 246. Alternatively, the user could specify at least one of a concentration of the treating chemistry and a soil level of the load being washed and the device would automatically dispense detergent in the optimal ratio to the incoming water, achieving and maintaining an ideal treating chemistry concentration. This could also be done by using dispensing commands sent by the controller 132 via the control line 246.

Figure 3:
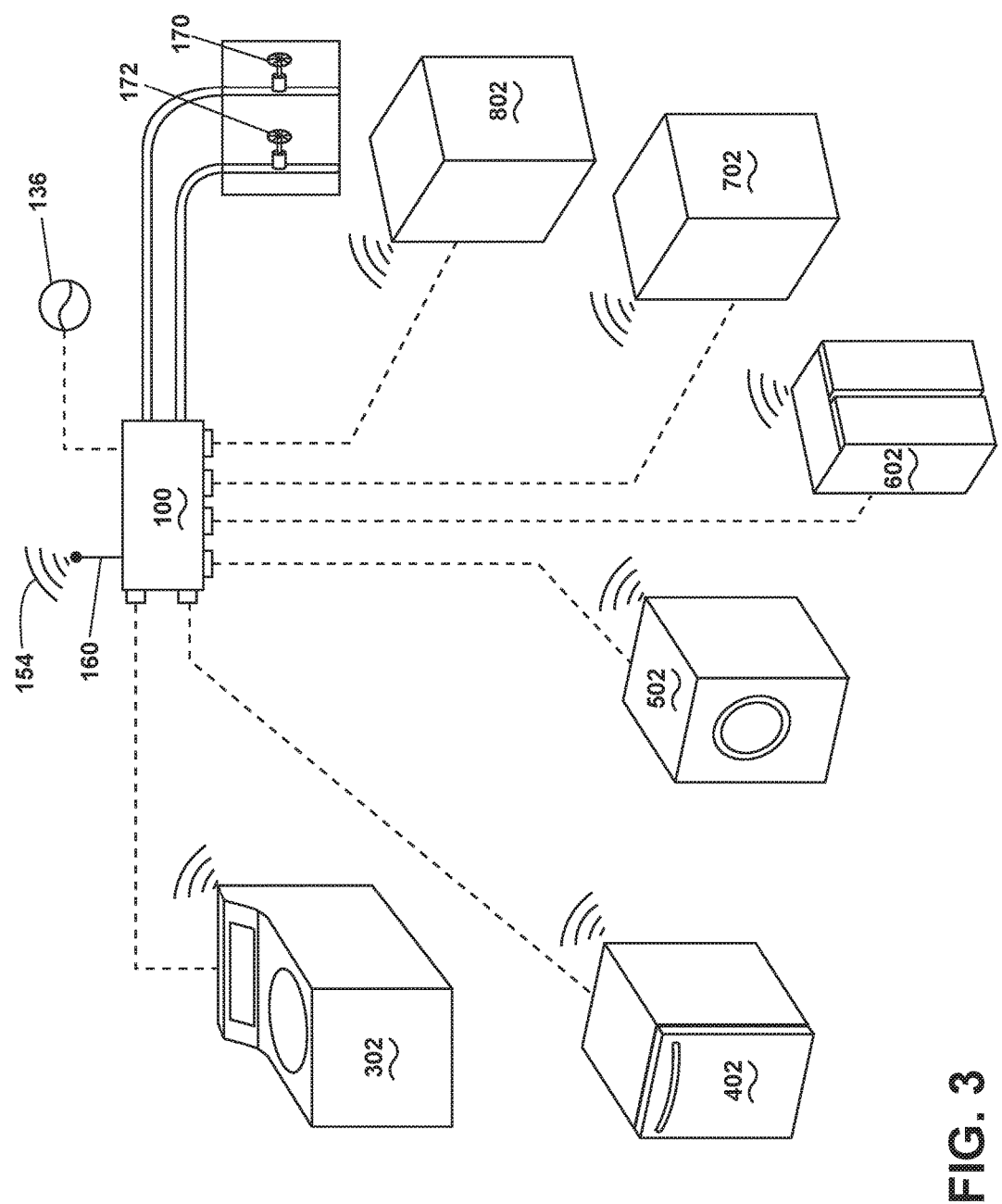
FIG. 3 is a schematic diagram of various potential configurations of a retrofit auxiliary appliance according to the invention.

As shown in FIG. 3, the retrofit auxiliary device 100 as described can be applicable to any household cleaning appliance, including, but not limited to a dishwasher and a household laundry appliance. In FIG. 3, the retrofit auxiliary device 100 is attached to utility lines similarly to as shown in FIG. 2, but the household cleaning appliance may be one of several options 302, 402, 502, 602, 702, 802 as shown, including but not limited to a top loading washing machine, a front loading washing machine or a dishwasher.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A retrofit auxiliary device for distributing cleaning resources to a household cleaning appliance having at least one water inlet, a detergent inlet, and a treating chamber, the retrofit auxiliary device comprising:

at least one water inlet configured to connect to a supply of water;

at least one outlet configured to connect to the at least one water inlet on the household cleaning appliance for distribution of water to the household cleaning appliance;

a flow meter fluidly coupled between the retrofit auxiliary device and the household cleaning appliance configured to monitor a flow of the water from the at least one water inlet of the retrofit auxiliary device to the household cleaning appliance and to transmit a signal containing water flow information;

a drain flow meter configured to monitor a flow of the water to the at least one outlet;

a memory having information that correlates the water flow information to a cycle of operation in the household cleaning appliance, wherein the information that correlates the water flow information to a cycle of operation in the household cleaning appliance is learned as the household cleaning appliance operates;

a detergent dispenser configured to connect to the detergent inlet of the household cleaning appliance to dispense a treating chemistry to the household cleaning appliance in response to receiving dispense commands;

a controller operably coupled to the flow meter, the memory, and the detergent dispenser; wherein the controller is configured to:
  determine a cycle of operation being executed by the household cleaning appliance based on the water flow information; and
  send dispense commands to the detergent dispenser in accordance with the determined cycle of operation.

2. The retrofit auxiliary device according to claim 1 wherein the water flow information includes an amount of water flowing from the at least one water inlet.

3. The retrofit auxiliary device according to claim 1 wherein the controller is further configured to send a notification of at least one of cycle information data, water usage, detergent usage, or efficiency.

4. The retrofit auxiliary device according to claim 1 further comprising a power monitor connected to the controller and configured to connect to the household cleaning appliance to measure energy usage in the cycle of operation.

5. The retrofit auxiliary device according to claim 4 wherein the controller is further configured to send a notification of at least one of a reminder to start a cycle of operation, a potential leak, appliance usage, status of a cycle of operation, or efficiency.

6. The retrofit auxiliary device according to claim 1 wherein the flow meter is one of an impeller, a turbine, an ultrasonic sensor, an electromagnetic sensor, or a capacitive sensor.

7. The retrofit auxiliary device according to claim 1 wherein the water flow information includes an amount of water flowing to the outlet.

8. The retrofit auxiliary device according to claim 1 wherein the drain flow meter is one of an impeller, a turbine, an ultrasonic sensor, an electromagnetic sensor, or a capacitive sensor.

9. The retrofit auxiliary device according to claim 1 wherein the controller is further configured to connect to a network for communication with other household cleaning appliances, receiving firmware and software updates, and communication with remote servers.

10. The retrofit auxiliary device according to claim 9 wherein the controller is configured to connect to the network wirelessly.

11. A retrofit auxiliary device for distributing cleaning resources to a household cleaning appliance having a treating chamber, the retrofit auxiliary device comprising:
  at least one water inlet configured to connect to a supply of water;
  at least one outlet configured to connect to the household cleaning appliance for distribution of water within the household cleaning appliance;
  a flow meter configured to monitor a flow of the water from the at least one water inlet and to transmit a signal containing water flow information;
  a drain flow meter configured to monitor a flow of the water to the at least one outlet;
  a memory having information that correlates the water flow information to a cycle of operation in the household cleaning appliance, wherein the information that correlates the water flow information to a cycle of operation in the household cleaning appliance is learned as the household cleaning appliance operates;
  a detergent dispenser configured to connect to the household cleaning appliance to dispense a treating chemistry to the household cleaning appliance in response to receiving dispense commands; and
  a controller operably coupled to the flow meter, the memory, and the detergent dispenser; wherein the controller is configured to:
    determine a cycle of operation being executed by the household cleaning appliance based on the water flow information; and
    send dispense commands to the detergent dispenser in accordance with the determined cycle of operation.

12. The retrofit auxiliary device according to claim 11 wherein the water flow information includes an amount of water flowing to the outlet.

13. The retrofit auxiliary device according to claim 11 wherein the controller is further configured to send a notification of at least one of cycle information data, water usage, detergent usage, or efficiency.

14. The retrofit auxiliary device according to claim 11 wherein the drain flow meter is one of an impeller, a turbine, an ultrasonic sensor, an electromagnetic sensor, or a capacitive sensor.

15. The retrofit auxiliary device according to claim 11 wherein the water flow information includes an amount of water flowing from the at least one water inlet.

16. The retrofit auxiliary device according to claim 11 further comprising a power monitor connected to the controller and configured to connect to the household cleaning appliance to measure energy usage in the cycle of operation.

* * * * *